US008630918B1

(12) United States Patent
Krechel et al.

(10) Patent No.: US 8,630,918 B1
(45) Date of Patent: Jan. 14, 2014

(54) METHODS AND SYSTEMS FOR MANAGING PART REPLACEMENT

(75) Inventors: William E. Krechel, Thompsons Station, TN (US); Kenneth G. Owens, Olivette, MO (US); Alexandra Brintrup, London (GB); Tomas Sanchez-Lopez, Cardiff (GB); Duncan McFarlane, Cambridge (GB); Mark G. Harrison, Cambridge (GB)

(73) Assignee: The Boeing Company, Chicago, IL (US)

( * ) Notice: Subject to any disclaimer, the term of this patent is extended or adjusted under 35 U.S.C. 154(b) by 357 days.

(21) Appl. No.: 13/185,010

(22) Filed: Jul. 18, 2011

(51) Int. Cl.
 *G06Q 30/00* (2012.01)
(52) U.S. Cl.
 USPC ............................................. 705/26.5
(58) Field of Classification Search
 USPC .............................. 705/26.1, 26.5; 700/95, 97
 See application file for complete search history.

(56) References Cited

U.S. PATENT DOCUMENTS

| 6,401,157 | B1* | 6/2002 | Nguyen et al. | 710/302 |
| 6,798,997 | B1* | 9/2004 | Hayward et al. | 399/12 |
| 8,311,906 | B1* | 11/2012 | Campbell et al. | 705/28 |
| 2002/0072998 | A1* | 6/2002 | Haines et al. | 705/28 |
| 2011/0029658 | A1* | 2/2011 | Werth et al. | 709/224 |
| 2012/0271503 | A1* | 10/2012 | Owens et al. | 701/29.1 |

FOREIGN PATENT DOCUMENTS

JP  2009237761 A  * 10/2009

OTHER PUBLICATIONS

Anon., "Car Tells Service Garage Which Components Require Attention," Professional Engineering, vol. 20, No. 12, p. 53, Jun. 27, 2007.*
Brintrup, Alexandra, et al., Will Intelligent Assets Take Off? Towards Self-Serving Aircrafts, 13 pages.
Kruse, Sebastian, et al., Self-serving assets are competing! A multi-agent system for handling competition among products, Apr. 2010, 17 pages, vol. ?, No. ?, IEEE Transactions on Computational Intelligence and AI in Games.

* cited by examiner

*Primary Examiner* — Nicholas D Rosen
(74) *Attorney, Agent, or Firm* — Armstrong Teasdale LLP

(57) ABSTRACT

Methods and systems for use in managing part replacement associated with a manufactured product. A part agent, executed by a computing system and associated with a current part installed in the manufactured product, provides a replacement notification to an ordering manager agent executed by the computing system and associated with the current part. The replacement notification indicates that a replacement of the current part is desired. The ordering manager agent determines that the current part is associated with a configuration change that represents a substitution of a new part for the current part. The ordering manager agent provides the configuration change to the part agent. The part agent orders the new part via the ordering manager agent based on the configuration change.

20 Claims, 3 Drawing Sheets

METHODS AND SYSTEMS FOR MANAGING PART REPLACEMENT

BACKGROUND

The field of the disclosure relates generally to asset management and, more specifically, to methods and systems for use in managing part replacement associated with a manufactured product.

At least some known configuration management processes are largely manually implemented, with components being monitored by maintenance personnel and with component status being determined by physical inspection. In such processes, changes to configuration are captured when suppliers provide change notifications to the configuration manager for manual update of a configuration database, and no system intelligence may be available to identify configuration changes so sourcing and ordering decisions are based on the last known item state. Similarly, monitoring of life-limited or operation limited (e.g., flight-hour limited) parts may be a manual process of tracking installation date against scheduled maintenance removal intervals.

BRIEF DESCRIPTION

In one aspect, a method for use in managing part replacement associated with a manufactured product is provided. The method includes providing, by a part agent executed by a computing system and associated with a current part installed in the manufactured product, a replacement notification to an ordering manager agent executed by the computing system and associated with the current part. The replacement notification indicates that a replacement of the current part is desired. The ordering manager agent determines that the current part is associated with a configuration change that represents a substitution of a new part for the current part. The ordering manager agent provides the configuration change to the part agent. The part agent orders the new part via the ordering manager agent based on the configuration change.

In another aspect, a system for use in managing part replacement associated with a manufactured product is provided. The system includes a storage device and a processor unit coupled in communication with the storage device. The storage device is configured to store a configuration database that includes a desired configuration associated with a manufactured product. The desired configuration includes a specification of parts. The processor unit is programmed to provide, by a part agent associated with a current part installed in the manufactured product, a replacement notification to an ordering manager agent associated with the current part. The replacement notification indicates that a replacement of the current part is desired. The processor unit is also programmed to determine, by the ordering manager agent, that the current part is associated with a configuration change that represents a substitution of a new part for the current part based on the specification of parts in the configuration database. The processor unit is further programmed to provide, by the ordering manager agent, the configuration change to the part agent, and to order, by the part agent, the new part via the ordering manager agent based on the configuration change.

In yet another aspect, one or more non-transitory computer-readable media having computer-executable components embodied thereon are provided. The computer-executable components include a part agent and an ordering manager agent. When executed by at least one processor unit, the part agent causes the processor unit to provide a replacement notification to an ordering manager agent associated with the current part. The replacement notification indicates that a replacement of the current part is desired. When executed by at least one processor unit, the ordering manager agent causes the processor unit to determine that the current part is associated with a configuration change that represents a substitution of a new part for the current part, to provide the configuration change to the part agent, and to order the new part in response to an order request by the part agent.

The features, functions, and advantages that have been discussed can be achieved independently in various embodiments or may be combined in yet other embodiments further details of which can be seen with reference to the following description and drawings.

DETAILED DESCRIPTION

Embodiments described herein are directed to automated methods of managing part replacement using a Self-Aware Assets in a Highly Networked Environment (SAHNE) system, in which physical parts are represented by software agents. Part agents are aware of which part they connect to through their unique part identification numbers, and are aware of their system composition through configuration data integration. Using this data, agents automate the process of identifying physical configuration changes prior to part replacement or refurbishment and automate the decision to order service in response to said configuration changes. The automated ordering process is managed by ordering manager agents, which search for part providers through directory or "yellow page" agents and negotiate with external supplier systems through supplier agents. Ordering manager agents may be organized by part type and may form societies with other ordering manager agents for ease of messaging when changes occur that concern all ordering manager agents associated with a manufactured product, such as a vehicle. Further, in some embodiments, ordering manager agents form societies with their associated part agents. Such societies facilitate the exchange (e.g., broadcast) of messages within the society.

Exemplary embodiments automate the configuration management process, enabling ordering of replacement parts based on up-to-date information regarding individual product configurations. Accordingly, such embodiments facilitate reducing costs associated with errors in manual inspection and sourcing decisions, ensuring compatibility of installed parts, and reducing labor costs for service and maintenance activities.

Figure 1:
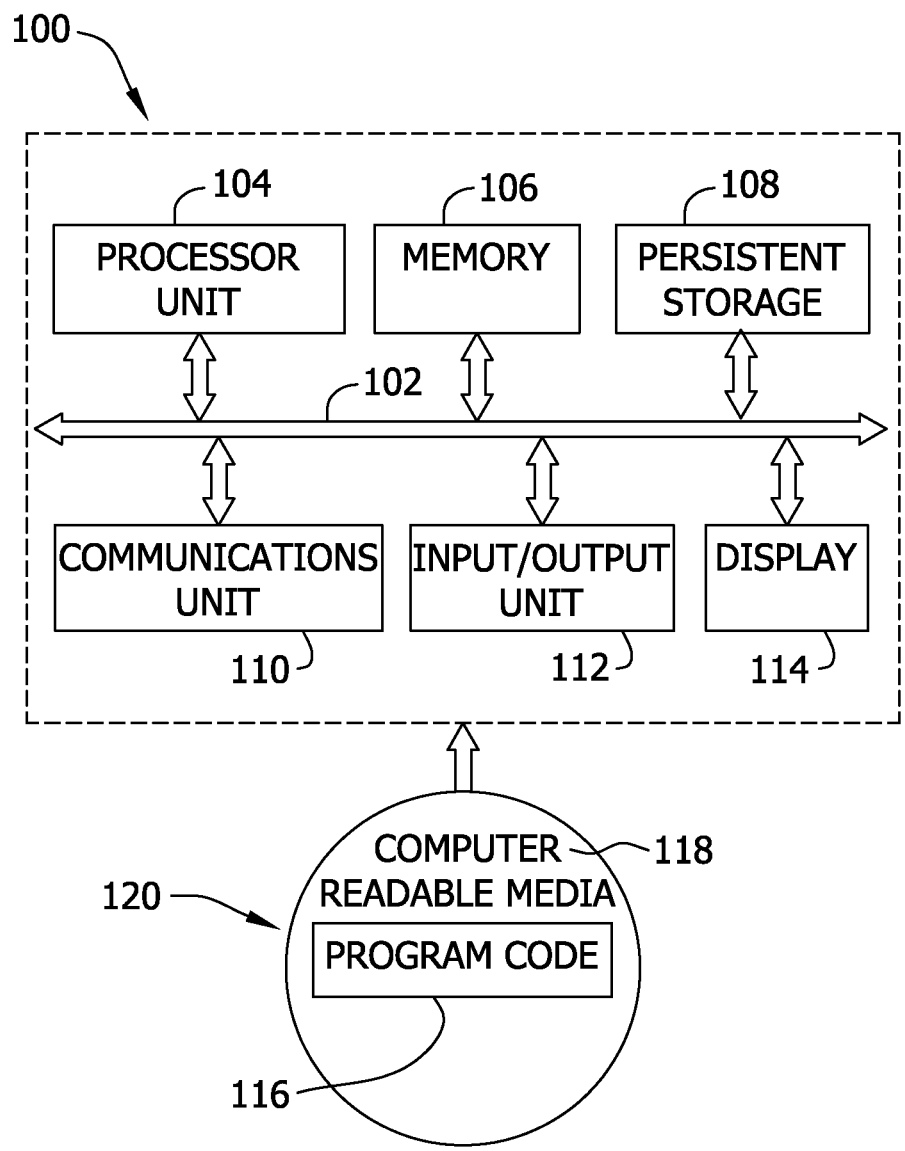
FIG. 1 is a block diagram of an exemplary computing device.

FIG. 1 is a block diagram of an exemplary computing device 100. In the exemplary embodiment, computing device 100 includes communications fabric 102 that provides communications between a processor unit 104, a memory 106, persistent storage 108, a communications unit 110, an input/output (I/O) unit 112, and a presentation interface, such as a display 114. In addition to, or in alternative to, the presentation interface may include an audio device (not shown) and/or any device capable of conveying information to a user.

Processor unit 104 executes instructions for software that may be loaded into memory 106. Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another embodiment, processor unit 104 may be a homogeneous processor system containing multiple processors of the same type.

Memory 106 and persistent storage 108 are examples of storage devices. As used herein, a storage device is any piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store computer-executable instructions, executable software components (e.g., part agents, ordering manager agents, and/or supplier agents), product configurations, available parts, parts installed in a product, configuration changes, and/or any other information suitable for use with the methods described herein.

Communications unit 110, in these examples, provides for communications with other computing devices or systems. In the exemplary embodiment, communications unit 110 is a network interface card. Communications unit 110 may provide communications through the use of either or both physical and wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information, such as any information described herein, to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different embodiments may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different embodiments may be embodied on different physical or tangible computer-readable media, such as memory 106 or persistent storage 108.

Program code 116 is located in a functional form on non-transitory computer-readable media 118 that is selectively removable and may be loaded onto or transferred to computing device 100 for execution by processor unit 104. Program code 116 and computer-readable media 118 form computer program product 120 in these examples. In one example, computer-readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer-readable media 118 also may take the form of a persistent storage, such as a hard drive, a thumb drive, or a flash memory that is connected to computing device 100. The tangible form of computer-readable media 118 is also referred to as computer recordable storage media. In some instances, computer-readable media 118 may not be removable.

Alternatively, program code 116 may be transferred to computing device 100 from computer-readable media 118 through a communications link to communications unit 110 and/or through a connection to input/output unit 112. The communications link and/or the connection may be physical or wireless in the illustrative examples. The computer-readable media also may take the form of non-tangible media, such as communications links or wireless transmissions containing the program code.

In some illustrative embodiments, program code 116 may be downloaded over a network to persistent storage 108 from another computing device or computer system for use within computing device 100. For instance, program code stored in a computer-readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include one or more part agents, ordering manager agents, supplier agents, and/or any component suitable for practicing the methods described herein. Each component may include computer-executable instructions that, when executed by processor unit 104, cause processor unit 104 to perform one or more of the operations described herein.

The different components illustrated herein for computing device 100 are not meant to provide architectural limitations to the manner in which different embodiments may be implemented. The different illustrative embodiments may be implemented in a computer system including components in addition to or in place of those illustrated for computing device 100. For example, other components shown in FIG. 1 can be varied from the illustrative examples shown.

As one example, a storage device in computing device 100 is any hardware apparatus that may store data. Memory 106, persistent storage 108 and computer-readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
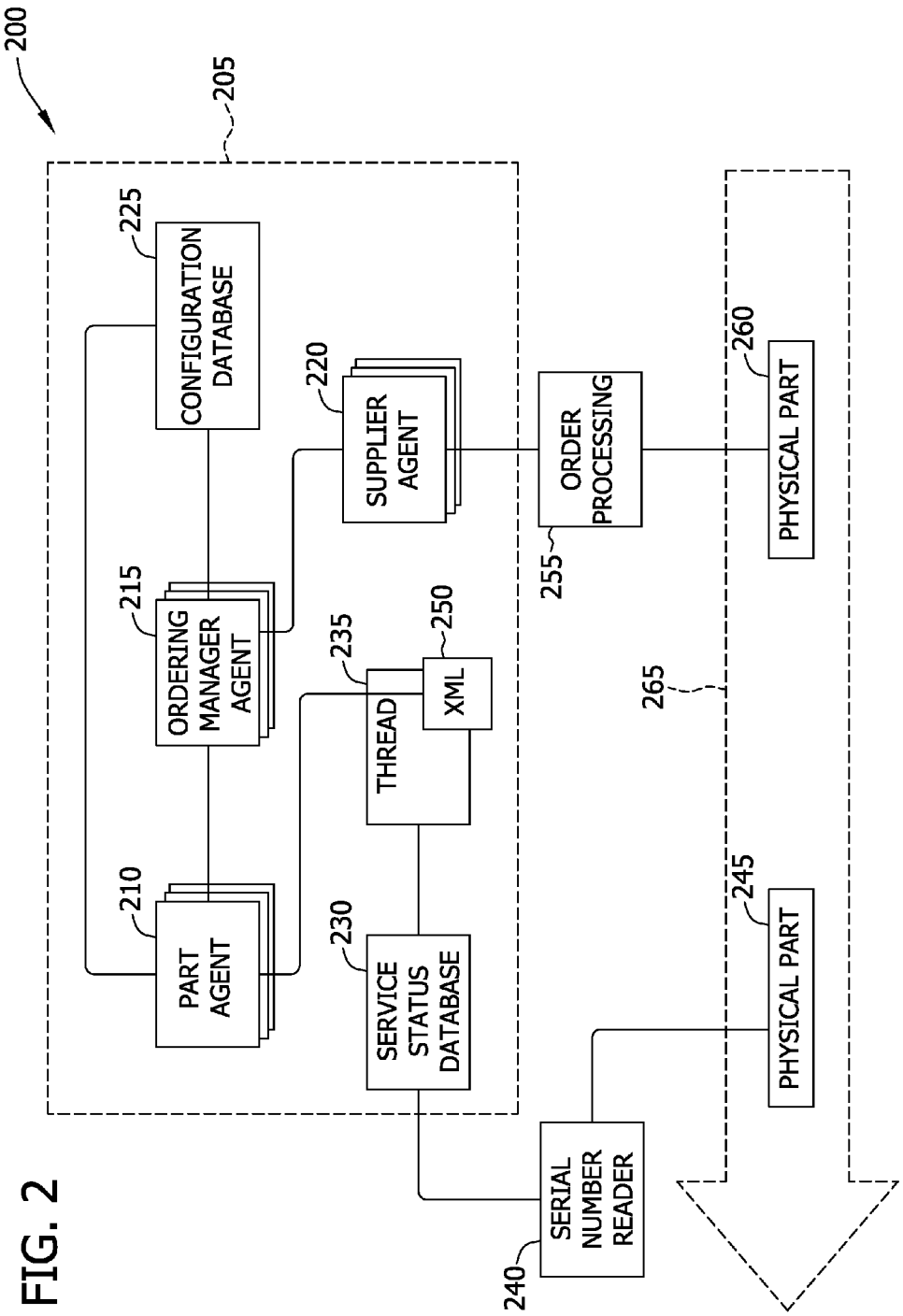
FIG. 2 is a block diagram illustrating an exemplary computing system for use in managing part replacement associated with a manufactured product.

FIG. 2 is a block diagram illustrating an exemplary computing system 200 for use in managing part replacement associated with a manufactured product. System 200 includes a software system 205 that is executed by one or more computing devices 100 (shown in FIG. 1). Software system 205 includes part agents 210, ordering manager agents 215, supplier agents 220, a part configuration database 225, a service status database 230, and a thread 235 for creating part agents 210.

In exemplary embodiments, part configuration database 225 stores part and/or product information, such as a specification of parts associated with a manufactured product, such as, without limitation, a vehicle (e.g., an aircraft). The parts and/or the specification of parts associated with a product in part configuration database 225 may be modified over time. For example, a revised part may be substituted for an earlier part due to a design change, a supplier change, or any other factor that may affect the availability or suitability of the earlier part. In addition, or alternatively, a revised version of the product may be defined, such as by changing a plurality of parts in the specification associated with the product. Such modifications to parts and products are referred to herein as configuration changes.

Part information stored in part configuration database 225 may be created automatically by software system 205. In some embodiments, a serial number reader 240 at a service location is used to scan a physical part 245 and determine a unique identifier (ID) associated with physical part 245. Serial number reader 240 submits the unique ID to service status database 230, which identifies physical part 245 as a new part. Thread 235 detects the new unique ID in service status database 230 and generates a description of the expected attributes and description of a part agent 210 associated with physical part 245. The description may be generated as an Extensible Markup Language (XML) file 250, for example.

A part agent 210 is created by thread 235 to represent physical part 245 and associated with XML file 250, such that the configuration (e.g., expected attributes and behavior) of part agent 210 is accessible to part agent 210. Part agent 210 stores the configuration in part configuration database 225, creating a persistent record of the configuration status. Any quantity of physical parts 245 may be detected, represented by a part agent 210, and stored in part configuration database 225, as described above.

Figure 3:
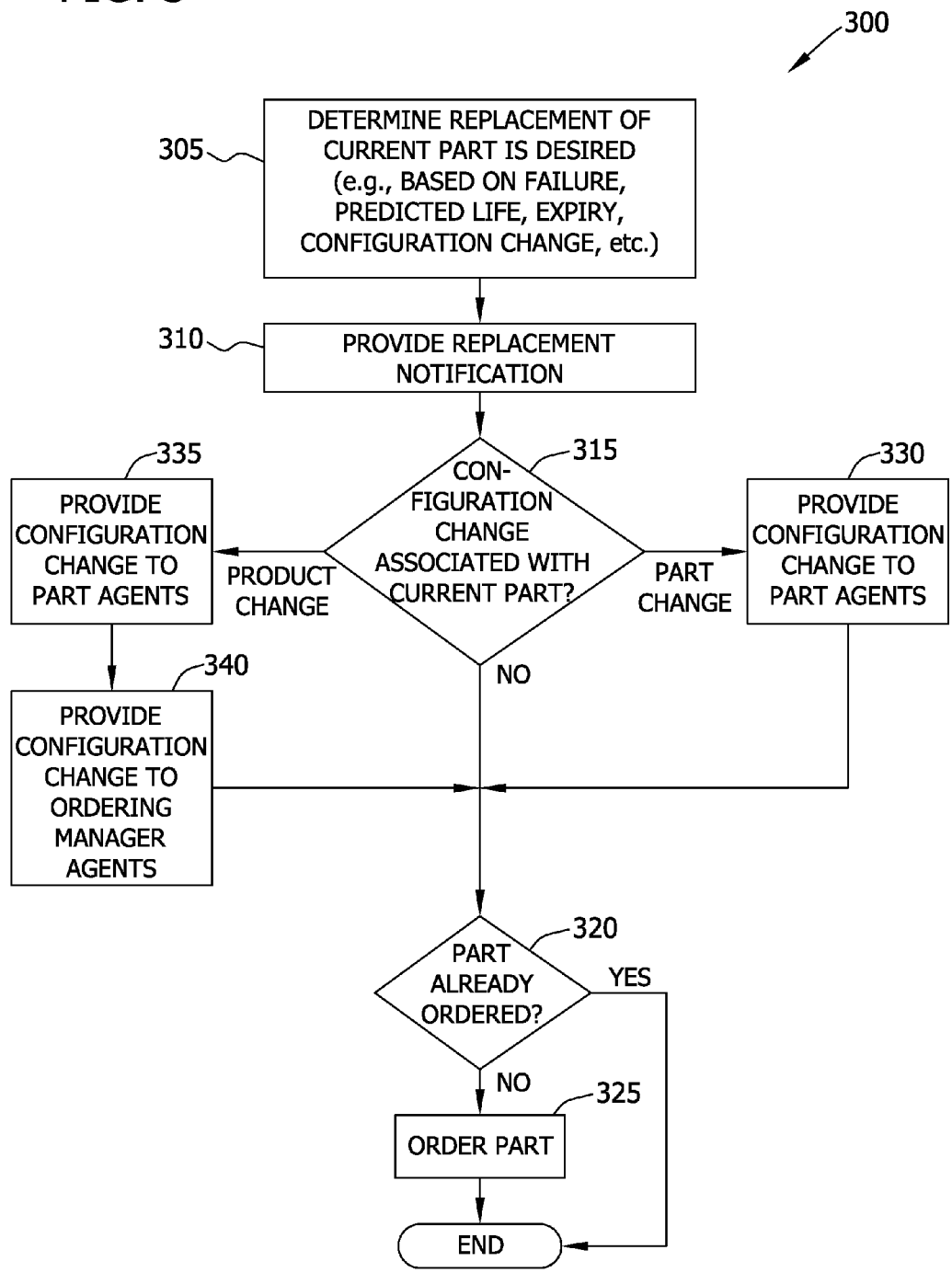
FIG. 3 is a flowchart of an exemplary method that may be performed using the system shown in FIG. 2.

FIG. 3 is a flowchart of an exemplary method 300 that may be performed using system 200. Referring to FIGS. 2 and 3, in exemplary embodiments, part agent 210 determines 305 that a replacement of the physical part 245 that is currently installed in a manufactured product (e.g., a vehicle) and represented by part agent 210 is desired. For example, part agent 210 may determine 305 that replacement is desired based at least in part on a configuration change affecting current part 245, a failure of current part 245, a predicted life of current part 245, an expiry associated with current part 245, an explicit replacement request, and/or any other occurrence that may indicate replacement of current part 245 is desired.

Part agent 210 provides 310 a replacement notification to an ordering manager agent 215 that is associated with part agent 210 and/or with current part 245. The replacement notification indicates that a replacement of current part 245 is desired.

Ordering manager agent 215 determines 315 whether any configuration change is associated with current part 245. In exemplary embodiments, part configuration database 225 includes a desired configuration associated with the manufactured product. The desired configuration includes a specification of parts and may be modified over time, as described above. In such embodiments, ordering manager agent 215 determines 315 whether a configuration change is associated with current part 245 at least in part by querying part configuration database 225 for the desired configuration based on the unique ID of current part 245 and/or an ID associated with the manufactured product in which current part 245 is installed or was previously installed.

If no configuration change is associated with current part 245, part agent 210 determines 320 whether a replacement part is already ordered. If so, part agent 210 terminates the ordering process. Otherwise, part agent 210 orders 325 the replacement part via ordering manager agent 215 based on the determination 320 that the part has not already been ordered. Ordering manager agent 215 forwards the order to supplier agent 220, which, in turn, transmits the order to an external order processing system 255 associated with the supplier represented by supplier agent 220.

If ordering manager agent 215 determines 315 that current part 245 is associated with a configuration change that represents a substitution of a new part for current part 245, ordering manager agent 215 provides 330 the configuration change to part agent 210 and, optionally, to any other part agents 210 that are associated with ordering manager agent 215 and/or with the part agent 210 that represents current part 245. Instead of attempting to acquire a direct replacement for current part 245, part agent 210 determines 320 whether the new part has already been ordered and, if not, orders 325 the new part via ordering manager agent 215 based on the configuration change.

If ordering manager agent 215 determines 315 that current part 245 is associated with a configuration change that represents a substitution of a plurality of new parts for a plurality of current parts that are installed in the manufactured product, ordering manager agent 215 provides 335 the configuration change to part agent 210 and, optionally, other associated part agents 210, as described above. Further, ordering manager agent 215 provides 340 the configuration change to other ordering manager agents 215 associated with the manufactured product, and these ordering manager agents, in turn, notify the part agents 210 associated therewith, as described above. Accordingly, ordering manager agent 215 effectively communicates the product-level configuration change to a plurality of part agents 210 associated with the plurality of current parts affected by the configuration change. Each part agent 210 of this plurality of part agents 210 orders 325 the new part that is substituted for the current part associated with the part agent 210. As such, a product-wide upgrade may be achieved, enabling the product to be brought into compliance with a new configuration, such as a new revision level (e.g., revision 1.0 to revision 1.1).

Regardless of whether the part ordered 325 is a direct replacement of current part 245 or a new part, external order processing system 255 manages the delivery of a replacement part 260 to the location of current part 245 through a distribution channel 265, such as by shipping replacement part 260 by truck or air.

Embodiments described herein enable configuration changes affecting the parts installed in a manufactured product, such as a vehicle, to be automatically discovered and communicated to software agents representing the individual parts. Based on the communication of a configuration change, replacement parts may be automatically ordered, such that an individual part may be brought into compliance with a new specification of the part and/or the entire product may be brought into compliance with a new specification of the product.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in managing part replacement associated with a manufactured product, said method comprising:
   providing, by a part agent executed by a computing system and associated with a current part installed in the manufactured product, a replacement notification to an ordering manager agent executed by the computing system and associated with the current part, wherein the replacement notification indicates that a replacement of the current part is desired;
   determining, by the ordering manager agent, that the current part is associated with a configuration change that represents a substitution of a new part for the current part;
   providing, by the ordering manager agent, the configuration change to the part agent; and
   ordering, by the part agent, the new part via the ordering manager agent based on the configuration change.

2. A method in accordance with claim 1, wherein the ordering manager agent determines that the current part is associated with a configuration change at least in part by determining that the manufactured product is associated with a configuration change that represents a substitution of a plurality of new parts for a plurality of current parts that are installed in the manufactured product.

3. A method in accordance with claim 2, further comprising:
   providing, by the ordering manager agent, the configuration change to a plurality of part agents associated with the plurality of current parts; and
   ordering, by each part agent of the plurality of part agents, the new part that is substituted for the current part associated with the part agent.

4. A method in accordance with claim 1, wherein the part agent orders the new part based at least in part on a determination that the new part is not already ordered.

5. A method in accordance with claim 1, further comprising determining, by the part agent, that the replacement of the current part is desired.

6. A method in accordance with claim 1, wherein the part agent determines that the replacement of the current part is desired based at least in part on a failure of the current part.

7. A method in accordance with claim 1, wherein the part agent determines that the replacement of the current part is desired based at least in part on at least one of a predicted life of the current part and an expiry associated with the current part.

8. A method in accordance with claim 1, wherein the ordering manager agent determines that the current part is associated with a configuration change at least in part by querying a part configuration database that includes a desired configuration associated with the manufactured product, wherein the desired configuration includes a specification of parts.

9. A system for use in managing part replacement associated with a manufactured product, said system comprising:
   a storage device configured to store a configuration database that includes a desired configuration associated with a manufactured product, wherein the desired configuration includes a specification of parts;
   a processor unit coupled in communication with said storage device, wherein said processor unit is programmed to:
      provide, by a part agent associated with a current part installed in the manufactured product, a replacement notification to an ordering manager agent associated with the current part, wherein the replacement notification indicates that a replacement of the current part is desired;
      determine, by the ordering manager agent, that the current part is associated with a configuration change that represents a substitution of a new part for the current part based on the specification of parts in the configuration database;
      provide, by the ordering manager agent, the configuration change to the part agent; and
      order, by the part agent, the new part via the ordering manager agent based on the configuration change.

10. A system in accordance with claim 9, wherein the ordering manager agent determines that the current part is associated with a configuration change at least in part by determining that the manufactured product is associated with a configuration change that represents a substitution of a plurality of new parts for a plurality of current parts that are installed in the manufactured product.

11. A method in accordance with claim 10, further comprising:
   providing, by the ordering manager agent, the configuration change to a plurality of part agents associated with the plurality of current parts; and
   ordering, by each part agent of the plurality of part agents, the new part that is substituted for the current part associated with the part agent.

12. A method in accordance with claim 9, wherein the part agent orders the new part based at least in part on a determination that the new part is not already ordered.

13. A method in accordance with claim 9, wherein said processor unit is further programmed to determine, by the part agent, that the replacement of the current part is desired based at least in part on at least one of a failure of the current part, a predicted life of the current part, and an expiry associated with the current part.

14. One or more non-transitory computer-readable media having computer-executable components embodied thereon, said computer-executable components comprising:
   a part agent that when executed by at least one processor unit causes the processor unit to:
      provide a replacement notification to an ordering manager agent associated with the current part, wherein the replacement notification indicates that a replacement of the current part is desired; and
   an ordering manager agent that when executed by at least one processor unit causes the processor unit to:
      determine that the current part is associated with a configuration change that represents a substitution of a new part for the current part;
      provide the configuration change to the part agent; and
      order the new part in response to an order request by the part agent.

15. One or more non-transitory computer-readable media in accordance with claim 14, wherein said ordering manager agent causes the processor unit to determine that the current part is associated with a configuration change at least in part by determining that the manufactured product is associated with a configuration change that represents a substitution of a plurality of new parts for a plurality of current parts that are installed in the manufactured product.

16. One or more non-transitory computer-readable media in accordance with claim 15, wherein said ordering manager agent further causes the processor unit to provide the configuration change to a plurality of part agent components associated with the plurality of current parts, wherein each part agent of the plurality of part agents orders the new part that is substituted for the current part associated with the part agent.

17. One or more non-transitory computer-readable media in accordance with claim 14, wherein said part agent further causes the processor unit to order the new part based at least in part on a determination that the new part is not already ordered.

18. One or more non-transitory computer-readable media in accordance with claim 14, wherein said part agent further causes the processor unit to determine that the replacement of the current part is desired.

19. One or more non-transitory computer-readable media in accordance with claim 18, wherein said part agent causes the processor unit to determine that the replacement of the current part is desired based at least in part on a failure of the current part.

20. One or more non-transitory computer-readable media in accordance with claim 18, wherein said part agent causes the processor unit to determine that the replacement of the current part is desired based at least in part on at least one of a predicted life of the current part and an expiry associated with the current part.

* * * * *